US011405922B2

(12) United States Patent
Xiao et al.

(10) Patent No.: US 11,405,922 B2
(45) Date of Patent: Aug. 2, 2022

(54) METHOD FOR RECONFIGURING DATA RADIO BEARER AND USER EQUIPMENT

(71) Applicant: SHARP KABUSHIKI KAISHA, Sakai (JP)

(72) Inventors: Fangying Xiao, Shanghai (CN); Renmao Liu, Shanghai (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/999,914

(22) Filed: Aug. 21, 2020

(65) Prior Publication Data

US 2021/0037515 A1 Feb. 4, 2021

Related U.S. Application Data

(63) Continuation of application No. 15/574,418, filed as application No. PCT/CN2016/081841 on May 12, 2016, now Pat. No. 10,863,513.

(30) Foreign Application Priority Data

May 15, 2015 (CN) .......................... 201510250750.9

(51) Int. Cl.
*H04W 72/04* (2009.01)
*H04W 76/10* (2018.01)
(Continued)

(52) U.S. Cl.
CPC ..... *H04W 72/048* (2013.01); *H04W 72/0413* (2013.01); *H04W 76/10* (2018.02);
(Continued)

(58) Field of Classification Search
CPC ........... H04W 72/0413; H04W 72/048; H04W 76/10; H04W 76/15; H04W 76/20; H04W 76/27
See application file for complete search history.

(56) References Cited

U.S. PATENT DOCUMENTS 9,906,450 B2   2/2018 Baillargeon et al.
2012/0057546 A1   3/2012 Wang et al.
(Continued)

FOREIGN PATENT DOCUMENTS

| CN | 104349389 A | 2/2015 |
|---|---|---|
| WO | 2015/065080 A1 | 5/2015 |
| WO | 2015/066385 A2 | 5/2015 |

OTHER PUBLICATIONS

"3rd Generation Partnership Project; Technical Specification Group Radio Access Network; Study on Small Cell enhancements for E-UTRA and EUTRAN; Higher layer aspects (Release 12)", 3GPP TR 36.842 V12.0.0 (Dec. 2013), pp. 1-71.
(Continued)

*Primary Examiner* — Gary Mui
(74) *Attorney, Agent, or Firm* — ScienBiziP, P.C.

(57) ABSTRACT

Provided is a method executed by user equipment, including: receiving a radio resource control (RRC) connection reconfiguration message; determining whether the received RRCConnectionReconfiguration message contains indication information, the indication information indicating user equipment (UE) to reconfigure a first type of data radio bearer (DRB) into a second type of DRB that is different from the first type of DRB; and in a case where the received RRCConnectionReconfiguration message contains the indication information, reconfiguring the UE according to the RRCConnectionReconfiguration message, wherein the first type of DRB includes a main cell group (MCG) DRB or a wireless local area network (WLN) non-split DRB, and the second type of DRB includes an MCG DRB, a WLN split DRB or a WLN non-split DRB. Corresponding user equipment is also provided.

2 Claims, 14 Drawing Sheets

(51) Int. Cl.
- *H04W 76/20* (2018.01)
- *H04W 76/15* (2018.01)
- *H04W 76/27* (2018.01)
- *H04L 69/18* (2022.01)
- *H04W 84/12* (2009.01)

(52) U.S. Cl.
CPC .......... *H04W 76/15* (2018.02); *H04W 76/20* (2018.02); *H04W 76/27* (2018.02); *H04L 69/18* (2013.01); *H04W 84/12* (2013.01)

(56) References Cited

U.S. PATENT DOCUMENTS

| | | | |
|---|---|---|---|
| 2014/0269575 | A1 | 9/2014 | Zhang et al. |
| 2015/0043435 | A1* | 2/2015 | Blankenship ...... H04B 7/15507 370/329 |
| 2015/0181461 | A1 | 6/2015 | Kim et al. |
| 2015/0181593 | A1 | 6/2015 | Kim et al. |
| 2015/0215826 | A1 | 7/2015 | Yamada |
| 2015/0215987 | A1 | 7/2015 | Kim et al. |
| 2016/0021581 | A1 | 1/2016 | Deenoo et al. |
| 2016/0057585 | A1 | 2/2016 | Horn et al. |
| 2016/0057800 | A1 | 2/2016 | Ingale et al. |
| 2016/0066241 | A1 | 3/2016 | Wu et al. |
| 2016/0128046 | A1* | 5/2016 | Sebire ...................... H04L 5/001 370/329 |
| 2016/0174281 | A1 | 6/2016 | Wen et al. |
| 2016/0212661 | A1 | 7/2016 | Basu Mallick et al. |
| 2016/0234726 | A1 | 8/2016 | Nuggehalli et al. |
| 2016/0255675 | A1 | 9/2016 | Van Lieshout et al. |
| 2016/0286412 | A1 | 9/2016 | Kim et al. |
| 2016/0316508 | A1 | 10/2016 | Hong et al. |
| 2016/0353507 | A1* | 12/2016 | Uemura ................ H04W 76/34 |
| 2017/0013668 | A1 | 1/2017 | Chang et al. |
| 2017/0215156 | A1 | 7/2017 | Chen |
| 2017/0367141 | A1 | 12/2017 | Nagasaka et al. |
| 2018/0035483 | A1 | 2/2018 | Nagasaka et al. |
| 2018/0091264 | A1 | 3/2018 | Laselva et al. |
| 2018/0092118 | A1* | 3/2018 | Kim .................. H04W 72/1278 |
| 2018/0092146 | A1* | 3/2018 | Hong ................ H04W 36/0055 |
| 2018/0146504 | A1* | 5/2018 | Xiao ..................... H04W 76/16 |
| 2018/0352488 | A1 | 12/2018 | Selvaganapathy et al. |

OTHER PUBLICATIONS

Ericsson, "LTE-WLAN Aggregation", R3-150737, 3GPP TSG-RAN WG3 #87bis, Tenerife—Santa Cruz, Spain, Apr. 20-24, 2015.
Ericsson, "LTE-WLAN aggregation", R2-151438, 3GPP TSG-RAN WG2 #89bis, Bratislava, Slovakia, Apr. 20-24, 2015.
Non-Final Office Action dated Aug. 18, 2020 for U.S. Appl. No. 16/577,336.
Intel Corporation, China Telecom, Qualcomm Incorporated, "New WI Proposal: LTE-WLAN Radio Level Integration and Interworking Enhancement", RP-150510, 3GPP TSG RAN Meeting #67, Shanghai, China, Mar. 9-12, 2015.
"3rd Generation Partnership Project; Technical Specification Group Radio Access Network; Study on Wireless Local Area Network (WLAN)—3GPP radio interworking (Release 12)", 3GPP TR37.834 (Dec. 2013), Valbonne, France.
"3rd Generation Partnership Project;Technical Specification Group Radio Access Network; Evolved Universal Terrestrial Radio Access (E-UTRA); Radio Resource Control (RRC); Protocol specification (Release 12)", 3GPP TS 36.331 V12.5.0 (Mar. 31, 2015), Valbonne, France.
Non-Final Rejection dated Dec. 17, 2018 for U.S. Appl. No. 15/574,429.
Notice of Allowance and Fees Due dated Apr. 10, 2019 for U.S. Appl. No. 15/574,429.
Samsung, "WLAN aggregation, overall DC procedure", R2-151138, 3GPP TSG-RAN2#89 bis meeting, Bratislava, Slovakia, Apr. 20-24, 2015.
Huawei et al., "Discussion of procedural specification for bearer type change in DC", R2-144124, 3GPP TSG RAN NG2 Meeting #87bis, Oct. 6-10, 2014, Shanghai, China.
Interdigital Communications, "Bearer Architecture for WLAN Integration for LTE R13", R2-151560, 3GPP TSG-RAN WG2 #89bis, Bratislava, Slovakia, Apr. 20-24, 2015.
Non-Final Rejection dated Dec. 20, 2018 for U.S. Appl. No. 15/574,418.
Non-Final Rejection dated Apr. 8, 2019 for U.S. Appl. No. 15/574,418.
Notice of Allowance and Fees Due dated Aug. 21, 2019 for U.S. Appl. No. 15/574,418.
Non-Final Rejection dated Jan. 2, 2020 for U.S. Appl. No. 15/574,418.
Notice of Allowance and Fees Due dated Apr. 20, 2020 for U.S. Appl. No. 15/574,418.
Corrected Notice of Allowance and Fees Due dated May 1, 2020 for U.S. Appl. No. 15/574,418.

* cited by examiner

--Related Art--

--Related Art--

METHOD FOR RECONFIGURING DATA RADIO BEARER AND USER EQUIPMENT

TECHNICAL FIELD

The present invention relates to mobile communication, in particular to a method for reconfiguring data radio bearer and user equipment.

BACKGROUND

Interoperability and integration of the Long Term Evolution (LTE) system of 3GPP and the Wireless Local Area Network (WLAN) at the core network level have been defined in the 3GPP standardization documents. 3GPP LTE Release 12 has studied the interoperability and integration of LTE and WLAN at the RAN level (see 3GPP TR37.834).

At the 3GPP TSG RAN #67 meeting, a research proposal was approved to enhance the integration and interoperability of LIE-WLAN at the RAN level in 3GPP LIE Release 13 (see 3GPP Proposal RP-150510). Research on enhancing integration and interoperability of LIE-WLAN at the RAN level includes: enhancing integration of LTE-WLAN at the RAN level and enhancing the interoperability of LTE-WLAN at the RAN level. The integration of LIE-WLAN at the RAN level means that user equipment in the RRC connection state is configured to utilize the radio resources, provided by both LIE and WLAN, all the while not affecting the existing standards on the MAC layer of WLAN. Enhancing integration of LIE-WLAN at the RAN level is based on dual-connection options, i.e., 2C and 3C, as defined by 3GPP LIE Release 12.

The options 2C and 3C illustrated in FIGS. 1 and 2 contain two logical nodes: main base station (MeNB) and WLN logical node. The MeNB refers to a base station that supports the integration and interoperability of LIE-WLN and is responsible for maintaining the RRM (Radio Resource Management) measurement configuration of user equipment and requesting the WLN to provide additional resources for the user equipment based on the received measurement report or traffic status or bearer type, etc. The WLN provides a data transmission service for the user equipment or rejects the request due to insufficient resources after receiving the request from the MeNB. The WLN refers to a logical node having functions of receiving user data from the MeNB and forwarding the data to the user equipment by using the radio resources provided by the WLAN.

The option 2C illustrated in FIG. 1 has the following characteristics: (1) the MeNB communicates with a service gateway through an S1-U interface; (2) a data radio bearer (DRB) is not split in the MeNB; (3) a Packet Data Convergence Protocol (PDCP) entity at the MeNB encapsulates the PDCP SDU from the service gateway into a format required by a receiving entity (known as an adaptation entity or WLN entity) of the WLN and sends it to the adaptation entity. The adaptation entity encapsulates the data received from the PDCP entity of the MeNB as required and then transmits it to the user equipment (UE) via the WLAN radio resources. Herein, the UE may be a user terminal, a user node, a mobile terminal, or a tablet computer. In the following description, the data radio bearer with characteristics of the option 2C is referred to as a WLN non-split data radio bearer (WLN non-split DRB).

The option 3C illustrated in FIG. 2 has the following characteristics: (1) the MeNB communicates with a service gateway through an S1-U interface; (2) a data radio bearer is split in the MeNB; (3) for a split data radio bearer, there is a corresponding radio link control (RLC) entity in the MeNB. The PDCP entity located at the MeNB encapsulates the PDCP SDU from the service gateway into a PDCP PDU and sends a portion of the encapsulated PDCP PDU to the UE through the RLC entity, the MAC entity, and the physical layer of the MeNB. The remaining PDCP PDU is further encapsulated as required and sent to the adaptation entity of the WLN, and to the UE via radio resources provided by the WLAN. In the following description of the present invention, a data radio bearer having the characteristics of the option 3C is referred to as WLN split data radio bearer (WLN split DRB).

The master cell group (MCG) cited in the present invention refers to a group of serving cells of UE, and the group of serving cells contains a primary cell (PCell) and 0 or more secondary cells (SCell). Based on the architecture of options 2C and 3C, in a system of LIE-WLAN integration and interoperation, in a case where user data transmitted by a DRB is transmitted only by using the MCG (i.e., the user data transmitted by a DRB is transmitted to UE via the PDCP entity, the RLC Entity, MAC entity, and physical layer (PHY) of the MCG), then the DRB is called the master cell group DRB (MCG DRB). In a case where the user data transmitted by a DRB is transmitted simultaneously using the radio resources of the MCG and the radio resources of the WLAN (i.e., a part of the user data transmitted by a DRB is transmitted to UE via the PDCP entity, the RLC entity, the MAC entity, and the physical layer PHY of the MCG, and the other part of the user data is transmitted to the UE via the PDCP entity of the MCG and the WLAN), then the DRB is called WLN split DRB (WLN split DRB). In a case where the user data transmitted by a DRB is encapsulated by the PDCP entity of the MCG and transmitted by using the radio resources provided by the WLAN, this DRB is called a WLN non-split data DRB (WLN non-split DRB). In other words, the user data of the WLN non-split DRB is not transmitted by the radio resources provided by the LTE, but rather is encapsulated by using the PDCP entity of the MCG, sent to the WLN, and then transmitted to the user equipment through the WLAN radio resources. In the present invention, the WLN split DRB and the WLN non-split DRB are collectively referred to as WLN DRB. That is, the WLN DRB mentioned in the present invention may indicate either a WLN split DRB or a WLN non-split DRB.

In a LTE-WLAN integrated system, it is necessary to dynamically perform DRB reconfiguration between the MeNB and the WLN, based on the available radio resources of the MeNB and the WLN. For example, when the MeNB cannot provide sufficient radio resources for the UE, the WLN may be requested to provide radio resources for the UE, i.e., the MCG DRB is reconfigured as a WLN split DRB or WLN non-split DRB. When the MeNB and the WLN are simultaneously serving the UE (i.e., based on the architecture of the option 3C), in a case where the MeNB has more radio resources available to the UE for a period of time but the WLN does not have sufficient radio resources available to the UE, the MeNB may reconfigure the DRB to the MeNB. In other words, reconfiguring the WLN split DRB as an MCG DRB, and in a case where the MeNB has no radio resources available to the UE for a period of time, but the WLN can provide more radio resources for the UE, the MeNB may reconfigure the DRB to the WLN, that is, the WLN split DRB is reconfigured as a WLN non-split DRB. When the WLN provides radio resources for UE alone to carry out data transmission after the data is encapsulated by the PDCP entity of the MeNB (i.e., an architecture based on the option 2C), in a case where the MeNB has more radio resources available to the UE for a period of time or the WLN does not have sufficient radio resources available to the UE, the MeNB may reconfigure the DRB to the MeNB In other words, reconfiguring the WLN split DRB as an MCG DRB, and in a case where the MeNB can provide a portion of radio resources for the UE for a period of time, in this case, the WLN non-split DRB is reconfigured as a WLN split DRB.

SUMMARY

It is an object of the present invention to solve the problem of radio bearer reconfiguration between a MeNB and a WLN.

According to one aspect of the present invention, there is provided a method executed by user equipment, including: receiving a radio resource control (RRC) connection reconfiguration message; determining whether the received RRCConnectionReconfiguration message contains indication information, the indication information indicating user equipment (UE) to reconfigure a first type of data radio bearer (DRB) into a second type of DRB that is different from the first type of DRB; and in a case where the received RRCConnectionReconfiguration message includes the indication information, reconfiguring the UE according to the RRCConnectionReconfiguration message, wherein the first type of DRB includes a main cell group (MCG) DRB or a wireless local area network (WLAN) non-split DRB, and the second type of DRB includes an MCG DRB, a WLN split DRB or a WLN non-split DRB.

In one embodiment, the first type of DRB is an MCG DRB, the second type of DRB is a WLN split DRB, and reconfiguring the UE according to the RRCConnectionReconfiguration message includes: reconfiguring an adaption entity according to configuration information contained in the RRCConnectionReconfiguration message and related to the adaption entity; reconfiguring a PDCP (Packet Data Convergence Protocol) entity in a case where the RRCConnectionReconfiguration message contains configuration information related to the PDCP entity; releasing an MCG RLC (Radio Link Control) entity and an MCG DTCH (dedicated channel) logical channel.

In one embodiment, the first type of DRB is an MCG DRB, the second type of DRB is a WLN split DRB, and reconfiguring the UE according to the RRCConnectionReconfiguration message includes: establishing an adaption entity according to configuration information contained in the RRCConnectionReconfiguration message and related to the adaption entity; reconfiguring a PDCP entity in a case where the RRCConnectionReconfiguration message contains configuration information related to the PDCP entity; releasing an MCG RLC entity and an MCG DTCH logical channel.

In one embodiment, the first type of DRB is a WLN split DRB, the second type of DRB is an MCG DRB, and reconfiguring the UE according to the RRCConnectionReconfiguration message includes: reconfiguring a PDCP entity in a case where the RRCConnectionReconfiguration message contains configuration information related to the PDCP entity; reconfiguring an MCG RLC entity and an MCG DTCH logical channel in a case where the RRCConnectionReconfiguration message contains configuration information related to the RLC entity and the MCG DTCH logical channel; and reconfiguring an adaption entity according to configuration information contained in the RRCConnectionReconfiguration message and related to the adaption entity.

In one embodiment, the first type of DRB is a WLN non-split DRB, the second type of DRB is an MCG DRB, and reconfiguring the UE according to the RRCConnectionReconfiguration message includes: reconfiguring a PDCP entity in a case where the RRCConnectionReconfiguration message contains configuration information related to the PDCP entity; establishing an MCG RLC entity and MCG DTCH logical channel in a case where the RRCConnectionReconfiguration message contains configuration information related to the RLC entity and the MCG DTCH logical channel; and releasing an adaption entity.

In one embodiment, the first type of DRB is a WLN non-split DRB, the second type of DRB is a WLN split DRB, and reconfiguring the UE according to the RRCConnectionReconfiguration message includes: establishing an MCG RLC entity and MCG DTCH logical channel according to the configuration information contained in the RRCConnectionReconfiguration message and related to the MCG RLC entity and the MCG DTCH logical channel; reconfiguring a PDCP entity in a case where the RRCConnectionReconfiguration message contains configuration information related to the PDCP entity; and reconfiguring an adaption entity in a case where the RRCConnectionReconfiguration message contains configuration information related to the adaption entity.

In one embodiment, the method further includes: re-establishing the PDCP entity.

In one embodiment, whether to re-establish the PDCP is ascertained by transmitting an RRC signaling to the UE.

In one embodiment, the indication information contains a drb-TypeChangWLN carried in drb-ToAddModList information element and a drb-TypeWLN information element carried in a drb-ToAddModListWLN. The drb-ToAddModList information element is a group of DRBs in need of addition or modification; the drb-TypeChangWLN information element is used for indicating whether to reconfigure a WLN split DRB or a WLN non-split DRB as an MCG DRB. The drb-ToAddModListWLN information element is a group of WLN DRBs in need of addition or modification. The drb-TypeWLN information element represents the Type of corresponding DRB. Preferably, according to the value of the drb-TypeWLN information element and whether the DRB corresponding to the drb-TypeWLN information element is contained in the drb-ToAddModList information element and the drb-ToAddModListWLN information element, it is possible to determine whether to reconfigure an MCG DRB as a WLN non-split DRB, a WLN non-split DRB as an MCG DRB, or a WLN non-split DRB as a WLN split DRB.

According to one aspect of the present invention, there is provided user equipment, including: a receiving unit, configured to receive a radio resource control (RRC) connection reconfiguration message; a determining unit, configured to determine whether the received RRCConnectionReconfiguration message contains indication information, the indication information indicating user equipment (UE) to reconfigure a first type of data radio bearer (DRB) into a second type of DRB that is different from the first type of DRB; and a reconfiguring unit, configured to reconfigure the UE according to the RRCConnectionReconfiguration message in a case where the received RRCConnectionReconfiguration message contains the indication information, wherein the first type of DRB includes a main cell group (MCG) DRB or a wireless local area network (WLN) non-split DRB, and the second type of DRB includes an MCG DRB, a WLN split DRB or a WLN non-split DRB.

In one embodiment, the first type of DRB is an MCG DRB, the second type of DRB is a WLN non-split DRB, and the reconfiguring unit is configured to reconfigure an adaption entity according to configuration information contained in the RRCConnectionReconfiguration message and related to the adaption entity; reconfigure a PDCP entity in a case where the RRCConnectionReconfiguration message contains configuration information related to the PDCP entity; and release an MCG RLC entity and an MCG DTCH logical channel.

In one embodiment, the first type of DRB is an MCG DRB, the second type of DRB is a WLN non-split DRB, and the reconfiguring unit is configured to establish an adaption entity according to configuration information contained in the RRCConnectionReconfiguration message and related to the adaption entity; reconfigure a PDCP entity in a case where the RRCConnectionReconfiguration message contains configuration information related to the PDCP entity; and release an MCG RLC entity and an MCG DTCH logical channel.

In one embodiment, the first type of DRB is a WLN non-split DRB, the second type of DRB is an MCG DRB, and the reconfiguring unit is configured to reconfigure a PDCP entity in a case where the RRCConnectionReconfiguration message contains configuration information related to the PDCP entity; establish an MCG RLC entity and an MCG DTCH logical channel in a case where the RRCConnectionReconfiguration message contains configuration information related to the RLC entity and the MCG DTCH logical channel; and reconfigure an adaption entity in a case where the RRCConnectionReconfiguration message contains configuration information related to the adaption entity.

In one embodiment, the first type of DRB is a WLN non-split DRB, the second type of DRB is an MCG DRB, and the reconfiguring unit is configured to reconfigure a PDCP entity in a case where the RRCConnectionReconfiguration message contains configuration information related to the PDCP entity; establish an MCG RLC entity and an MCG DTCH logical channel in a case where the RRCConnectionReconfiguration message contains configuration information related to the RLC entity and the MCG DTCH logical channel; and release an adaption entity.

In one embodiment, the first type of DRB is a WLN non-split DRB, the second type of DRB is an MCG DRB, and the reconfiguring unit is configured to establish an MCG RLC entity and an MCG DTCH logical channel according to configuration information contained in the RRCConnectionReconfiguration message and related to the adaption entity; reconfiguring a PDCP entity in a case where the RRCConnectionReconfiguration message contains configuration information related to the PDCP entity; releasing an MCG RLC entity and an MCG DTCH logical channel; and reconfigure an adaption entity in a case where the RRCConnectionReconfiguration message contains configuration information related to the adaption entity.

In one embodiment, the UE further includes: a re-establishing unit, configured to re-establish the PDCP entity.

In one embodiment, whether to re-establish the PDCP is ascertained by transmitting an RRC signaling to the UE.

In one embodiment, the indication information contains a drb-TypeChangWLN information element carried in drb-ToAddModList information element and a drb-TypeWLN information element carried in a drb-ToAddModListWLN information element. The drb-ToAddModList information element is a group of DRBs in need of addition or modification; the drb-TypeChangWLN information element is used for indicating whether to reconfigure a WLN split DRB or a WLN non-split DRB as an MCG DRB. The drb-ToAddModListWLN information element is a group of WLN DRBs in need of addition or modification. The drb-TypeWLN information element represents the Type of a corresponding DRB. Preferably, according to the value of the drb-TypeWLN information element and whether the DRB corresponding to the drb-TypeWLN information element is contained in the drb-ToAddModList information element and the drb-ToAddModListWLN information element, it is possible to determine whether to reconfigure an MCG DRB as a WLN non-split DRB or reconfigure a WLN non-split DRB as an MCG DRB or reconfigure a WLN non-split DRB as a WLN split DRB.

DESCRIPTION OF THE DRAWINGS

The features described above and other features of the present invention will become more apparent from the following detailed description in conjunction with the accompanying drawings, wherein.

DESCRIPTION OF THE EMBODIMENTS

Figure 1:
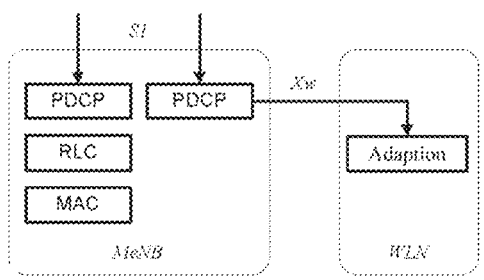
FIG. 1 is a schematic diagram of the option 2C of the LET-WLN integration and interoperability deployment.
Figure 2:
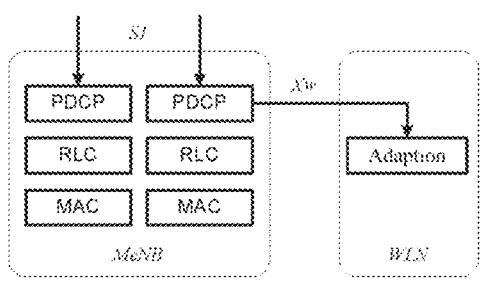
FIG. 2 is a schematic diagram of the option 3C of the LET-WLN integration and interoperability deployment.

The principle and implementation of the present invention will become apparent from the following description on specific embodiments of the present invention in conjunction with the accompanying drawings. Note that the present invention shall not be limited to the specific embodiments described below. In addition, for simplicity, a detailed description on the known art not directly related to the present invention is omitted to prevent confusion in the understanding of the present invention.

In the following description, an LTE Rel-13 mobile communication system and its later evolved releases are used as exemplary application environments to set forth embodiments of the present invention in detail. Note, however, that the present invention is not limited to the following embodiments and may be applicable to more other wireless communication systems, such as a future 5G cellular communication system. In addition, although the implementation examples of the technical solution of the present invention is described with respect to the case where the MeNB cooperates with one WLN to provide a communication service for the UE, a person skilled in the art would be conceivable of that the technical solution of the present invention likewise is applicable to the cases where the MeNB cooperates with more than one WLN to provide a communication service for the UE.

In the LIE system, the UE carries out the processes of adding (establishing) and reconfiguring a DRB according to a received RRCConnectionReconfiguration message. The RRCConnectionReconfiguration message is mainly used for establishing/modifying/releasing radio bearers (RBs) and executing switching, establishing/modifying/releasing measurement and the like. The RBs include signaling radio bearers (SRBs) and data radio bearers (DRBs) The data radio bearers (DRBs) include MCG DRBs, split DRBs (bearers for dual connection option 3C described in 3GPP Release 12), SCG DRBs (bearers for dual connection option 1A described in 3GPP Release 12), and bears for the transmission of user data, such as WLN split DRBs and WLN non-split DRBs.

In the following, the meanings of parameters contained in the RRCConnectionReconfiguration message cited herein are described. Furthermore, in a case where a parameter mentioned herein is the same as that in 3GPP TS36.331 in denomination, the meaning and inclusion relation between cells, represented by it, are the same as those in 3GPP TS36.331.

drb-ToAddModListWLN information element: a group of WLN DRBs in need of addition or modification;

drb-ToAddModList information element a group of DRBs in need of addition or modification; Adaptation-Config information element: containing configurable parameters corresponding to an adaption entity used for configuring WLN DRB;

pdcp-Config information element: containing configurable PDCP parameters of DRB; drb-Identity information element: DRB ID;

rlc-Config information element: containing configuration information of an RLC entity corresponding to SRB and DRB;

logicalChannelIdentity information element: logical channel ID; and:

logicalChannelConfig information element: containing parameters for configuring a logical channel.

Figure 3:
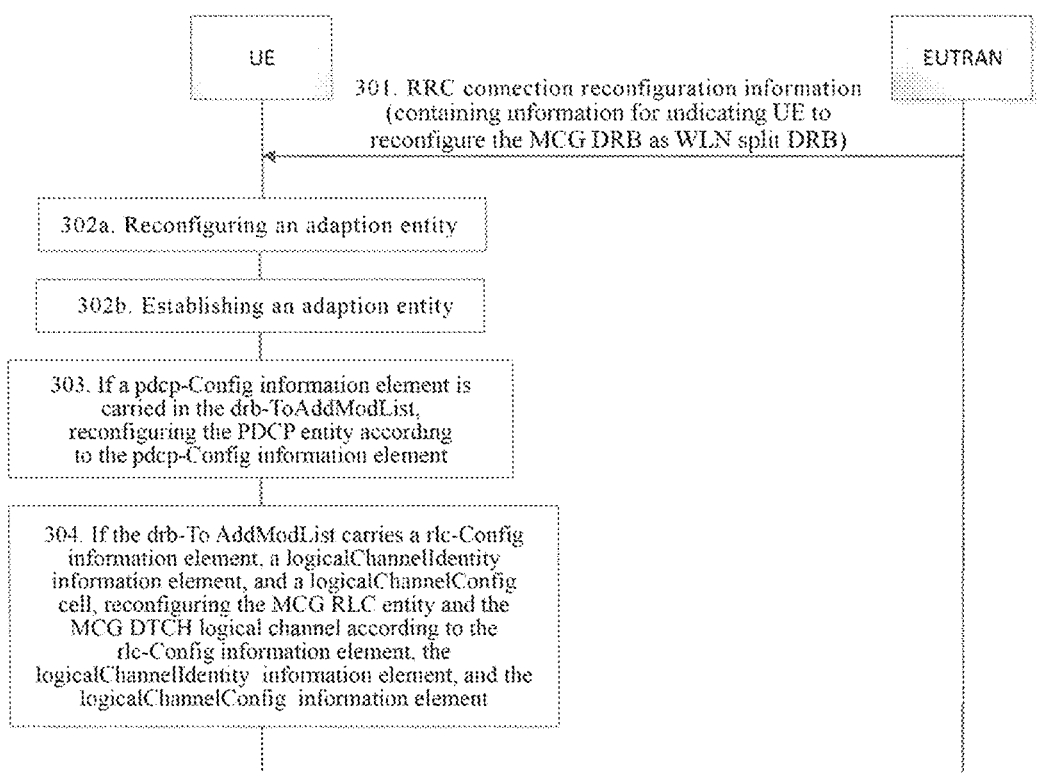
FIG. 3 is a flow chart of a method for reconfiguring an MCG DRB as a WLN split DRB, provided by an embodiment of the present invention.

FIG. 3 illustrates a flow chart of a method for reconfiguring an MCG DRB as a WLN split DRB. The method illustrated in FIG. 3 includes the following steps:

Step 301: UE receives the RRCConnectionReconfiguration message and determines whether the message carries indication information used for indicating UE to reconfigure an MCG DRB as a WLN split DRB; in a case where the message carries the indication information, step 302a or step 302b is executed according to the correspondence between the WLN DRB and an adaptation entity; otherwise, the process is ended.

In a case where there is a many-to-one mapping relationship between the WLN DRB and the adaptation entity, the process goes to step 302a; in a case where there is a one-to-one mapping relationship between the WLN DRB and the adaptation entity, the process goes to step 302b.

Step 302a: The UE reconfigures the adaptation entity according to the Adaptation-Config information element carried in drb-ToAddModListWLN.

Alternatively, an adaptation entity is to be established in a case where there is no adaptation entity in the WLN, i.e., the WLN split DRB reconfigured by the MCG DRB is the first WLN DRB of the adaptation entity.

Step 302b: The user establishes an adaptation entity based on the Adaptation-Config information element carried in drb-ToAddModListWLN.

Step 303: In a case where the pdcp-Config information element is carried in the drb-ToAddModList, the PDCP entity is reconfigured according to the pdcp-Config information element.

Step 304: In a case where the drb-ToAddModList carries the rlc-Config information element, the logicalChannelIdentity information element, and the logicalChannelConfig information element, the MCG RLC entity and the MCG DTCH logical channel are reconfigured according to the rlc-Config information element, the logicalChannelIdentity information element, and the logicalChannelConfig information element.

Note that the execution sequence of step 302a (or 302b), step 303, and step 304 may be arbitrarily changed.

Alternatively, when the UE reconfigures the MCG DRB as the WLN split DRB, the UE re-establishes the PDCP entity and the RLC entity and transmits a PDCP status report. Alternatively, the UE may be configured according to an RRC signaling whether to re-establish the PDCP entity and the RLC entity and transmit the PDCP status report when the MCG DRB is reconfigured as WLN split DRB.

Figure 4:
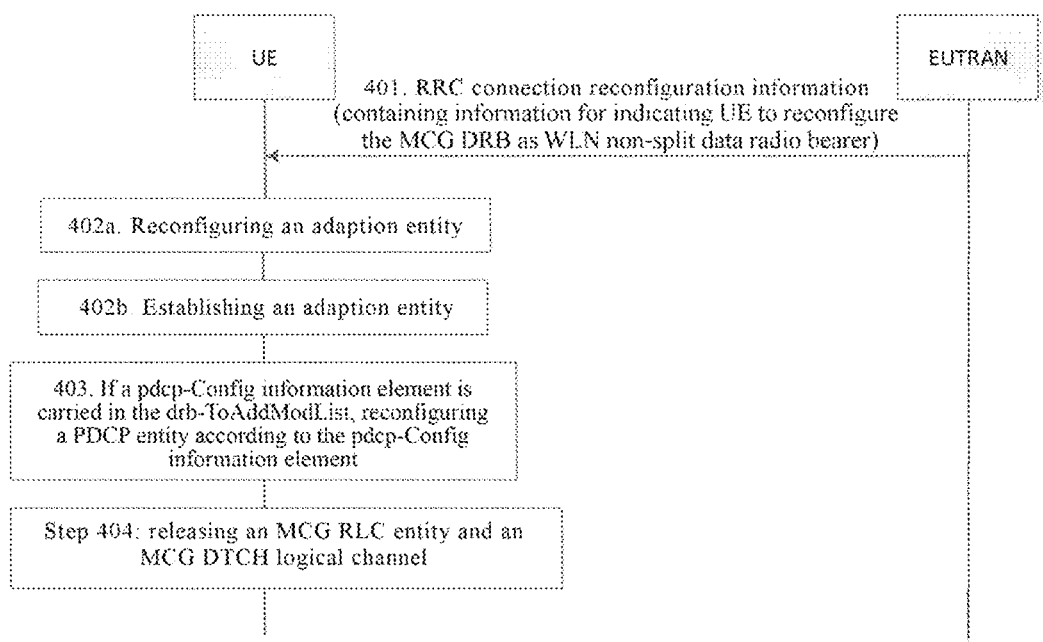
FIG. 4 is a flow chart of a method for reconfiguring an MCG DRB as a WLN non-split DRB, provided by an embodiment of the present invention.

FIG. 4 illustrates a flow chart of a method for reconfiguring an MCG DRB as a WLN non-split DRB. The method illustrated in FIG. 4 includes the following steps:

Step 401: UE receives the RRCConnectionReconfiguration message and determines whether the message carries an indication information used for indicating UE to reconfigure an MCG DRB as a WLN non-split DRB; in a case where the message carries the indication information, step 402a or step 402b is executed according to the correspondence between the WLN DRB and an adaptation entity; otherwise, the process is ended.

In a case where there is a many-to-one mapping relationship between the WLN DRB and the adaptation entity, the process goes to step 402a; in a case where there is a one-to-one mapping relationship between the WLN DRB and the adaptation entity, the process goes to step 402b.

Step 402a: The UE reconfigures the adaptation entity according to the Adaptation-Config information element carried in drb-ToAddModListWLN.

Alternatively, an adaptation entity is to be established in a case where there is no adaptation entity in the WLN, i.e., the WLN non-split DRB reconfigured by the MCG DRB is the first WLN DRB of the adaptation entity.

Step 402b: The UE establishes an adaptation entity based on the Adaptation-Config information element carried in drb-ToAddModListWLN.

Step 403: In a case where the pdcp-Config information element is carried in the drb-ToAddModList, the PDCP entity is reconfigured according to the pdcp-Config information element.

Step 404: The MCG RLC entity and the MCG DTCH logical channel are released.

Note that the execution sequence of step 402a (or 402b), step 403, and step 404 may be arbitrarily changed.

Alternatively, the UE re-establishes the PDCP entity and transmits a PDCP status report when the MCG DRB is reconfigured as the WLN non-split DRB. Alternatively, the UE may be configured according to an RRC signaling whether to re-establish the PDCP entity and transmit the PDCP status report when the MCG DRB is reconfigured as the WLN split DRB.

Figure 5:
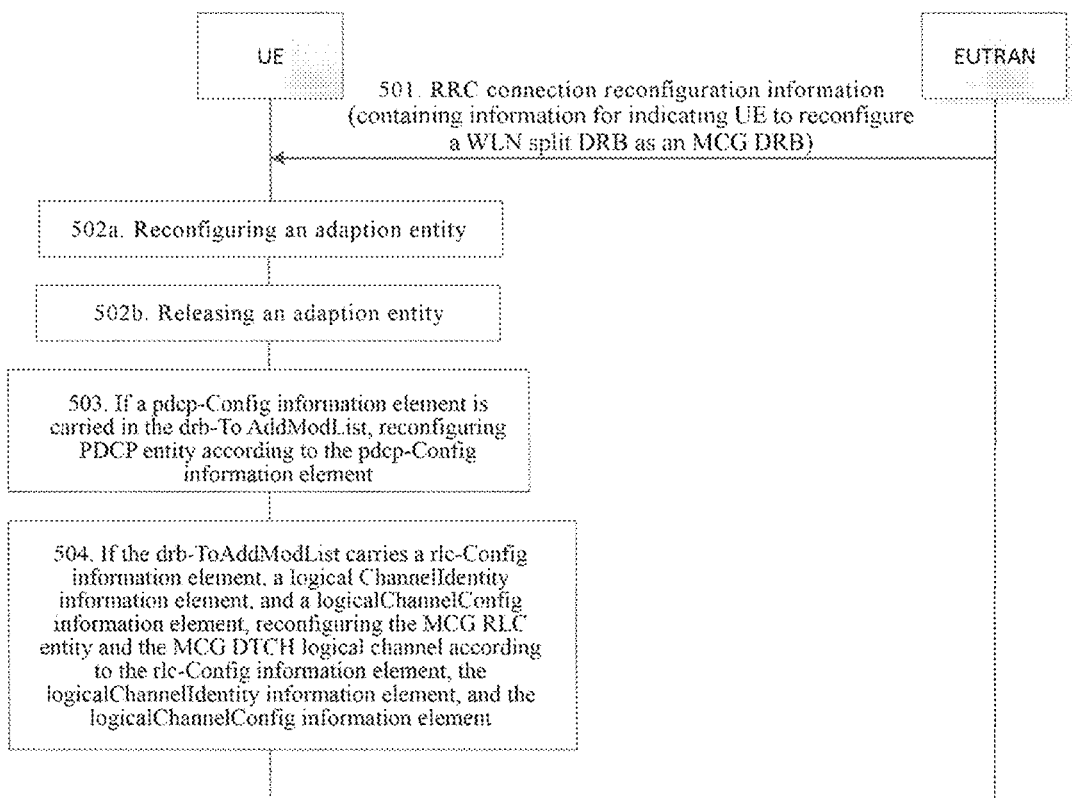
FIG. 5 is a flow chart of a method for reconfiguring a WLN split DRB as an MCG DRB, provided by an embodiment of the present invention.

FIG. 5 illustrates a flow chart of a method for reconfiguring a WLN split DRB as an MCG DRB.

The method illustrated in FIG. 5 includes the following steps:

Step 501: UE receives the RRCConnectionReconfiguration message and determines whether the message carries an indication information used for indicating UE to reconfigure a WLN split DRB as an MCG DRB; in a case where the message carries the indication information, step 502a or step 502b is executed according to the correspondence between the WLN DRB and an adaptation entity; otherwise, the process is ended.

In a case where there is a many-to-one mapping relationship between the WLN DRB and the adaptation entity, the process goes to step 502a; in a case where there is a one-to-one mapping relationship between the WLN DRB and the adaptation entity, the process goes to step 502b.

Step 502a: In a case where the Adaptation-Config information element is carried in the drb-ToAddModListWLN, the adaption entity is reconfigured according to the Adaptation-Config information element.

Alternatively, in a case where there is no other WLN DRB in the adaptation entity after the WLN split DRB is reconfigured as the MCG DRB, the adaptation entity is released.

Step 502b: The adaptation entity is released, that is, the relevant information of the WLN split DRB which is reconfigured as the MCG DRB in the WLN is released.

Step 503: In a case where the pdcp-Config information element is carried in the drb-ToAddModList, the PDCP entity is reconfigured according to the pdcp-Config information element.

Step 504: In a case where the drb-ToAddModList carries the rlc-Config information element, the logicalChannelIdentity information element, and the logicalChannelConfig information element, the MCG RLC entity and the MCG DTCH logical channel are reconfigured according to the rlc-Config information element, the logicalChannelIdentity information element, and the logicalChannelConfig information element.

Note that the execution sequence of step 502a (or 502b), step 503, and step 504 may be arbitrarily changed.

Alternatively, the UE re-establishes the PDCP entity and transmits a PDCP status report when the WLN split DRB is reconfigured as the MCG DRB. Alternatively, the UE may be configured according to an RRC signaling whether to re-establish the PDCP entity and transmit the PDCP status report when the MCG DRB is reconfigured as the WLN split DRB.

Figure 6:
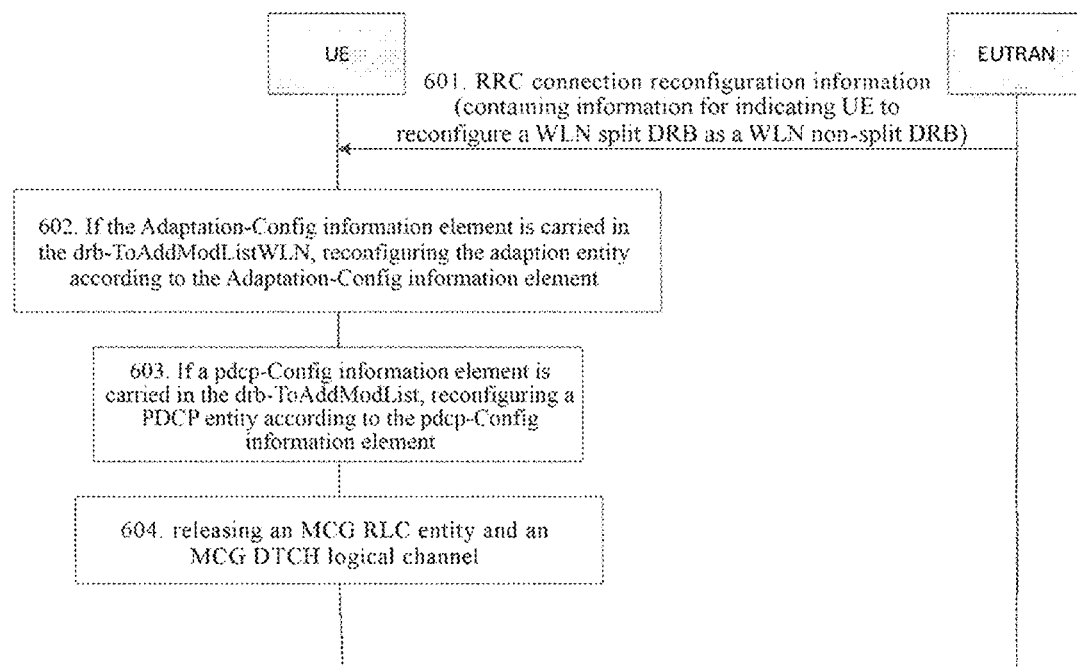
FIG. 6 is a flow chart of a method for reconfiguring a WLN split DRB as a WLN non-split DRB, provided by an embodiment of the present invention.

FIG. 6 illustrates a flow chart of a method for reconfiguring a WLN split DRB as a WLN non-split DRB. The method illustrated in FIG. 6 includes the following steps:

Step 601: UE receives an RRCConnectionReconfiguration message and determines whether the message carries an indication information used for indicating the UE to reconfigure a WLN split DRB as a WLN non-split DRB; in a case where the message carries the indication message, the process goes to step 602; otherwise, the process is ended.

Step 602a: In a case where the Adaptation-Config information element is carried in the drb-ToAddModListWLN, the adaption entity is reconfigured according to the Adaptation-Config information element.

Step 603: In a case where the pdcp-Config information element is carried in the drb-ToAddModList, the PDCP entity is reconfigured according to the pdcp-Config information element.

Step 604: The MCG RLC entity and the MCG DTCH logical channel are released.

Note that the execution sequence of step 602, step 603, and step 604 may be arbitrarily changed.

Alternatively, the UE re-establishes the PDCP entity and transmits a PDCP status report when the WLN split DRB is reconfigured as the WLN non-split DRB. Alternatively, the UE may be configured according to an RRC signaling whether to re-establish the PDCP entity and transmit the PDCP status report when the MCG DRB is reconfigured as the WLN split DRB.

Figure 7:
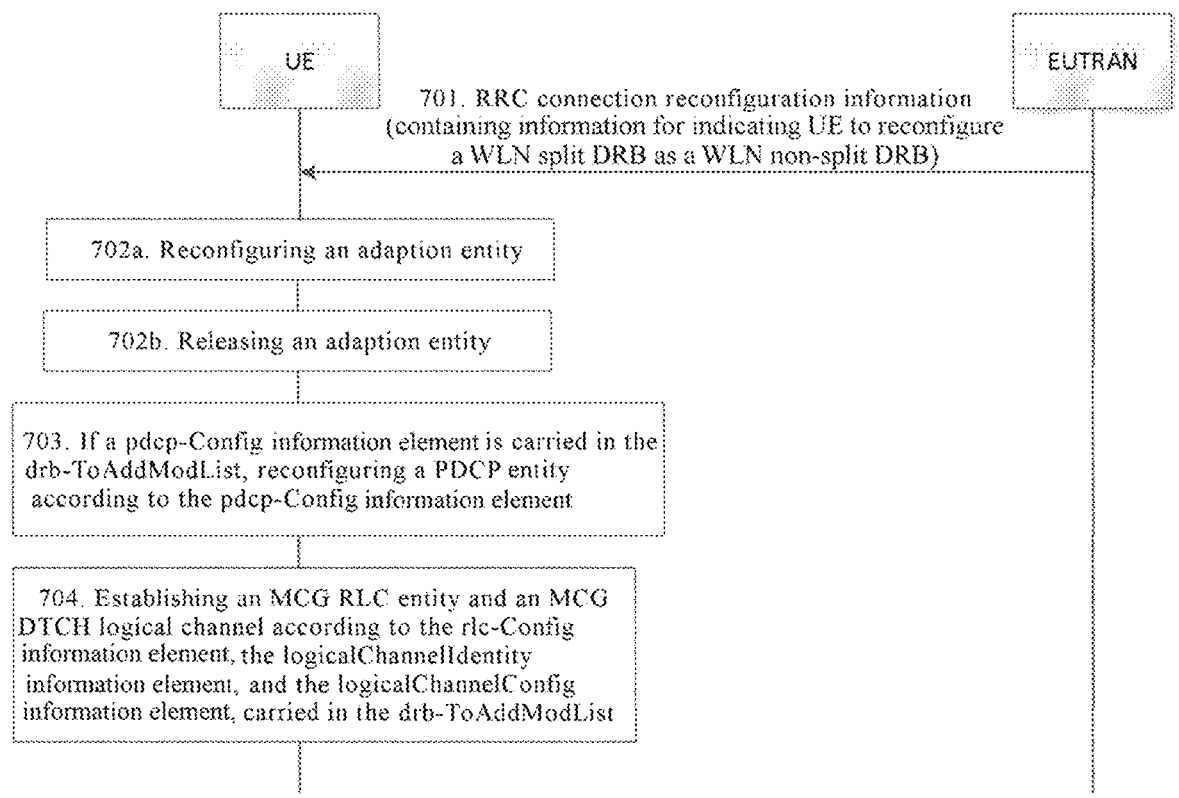
FIG. 7 is a flow chart of a method for reconfiguring a WLN non-split DRB as an MCG DRB, provided by an embodiment of the present invention.

FIG. 7 illustrates a flow chart of a method for reconfiguring a WLN non-split DRB as an MCG DRB. The method illustrated in FIG. 7 includes the following steps:

Step 701: UE receives the RRCConnectionReconfiguration message and determines whether the message carries an indication information used for indicating UE to reconfigure a WLN non-split DRB as an MCG DRB; in a case where the message carries the indication information, step 702a or step 702b is executed according to the correspondence between the WLN DRB and an adaptation entity; otherwise, the process is ended.

In a case where there is a many-to-one mapping relationship between the WLN DRB and the adaptation entity, the process goes to step 702a; in a case where there is a one-to-one mapping relationship between the WLN DRB and the adaptation entity, the process goes to step 702b.

Step 702a: In a case where the Adaptation-Config information element is carried in the drb-ToAddModListWLN, the adaption entity is reconfigured according to the Adaptation-Config information element.

Alternatively, in a case where there is no other WLN DRB in the adaptation entity after the WLN non-split DRB is reconfigured as the MCG DRB, the adaptation entity is released.

Step 702b: The adaptation entity is released, that is, the relevant information of the WLN non-split DRB which is reconfigured as the MCG DRB in the WLN is released.

Step 703: In a case where the pdcp-Config information element is carried in the drb-ToAddModList, the PDCP entity is reconfigured according to the pdcp-Config information element.

Step 704: The MCG RLC entity and the MCG DTCH logical channel are established according to the rlc-Config information element, the logicalChannelIdentity information element, and the logicalChannelConfig information element, carried in the drb-ToAddModList.

Note that the execution sequence of step 702a (or 702b), step 703, and step 704 may be arbitrarily changed.

Alternatively, the UE re-establishes the PDCP entity and transmits a PDCP status report when the WLN non-split DRB is reconfigured as the MCG DRB. Alternatively, the UE may be configured according to an RRC signaling whether to re-establish the PDCP entity and transmit the PDCP status report when the MCG DRB is reconfigured as the WLN split DRB.

Figure 8:
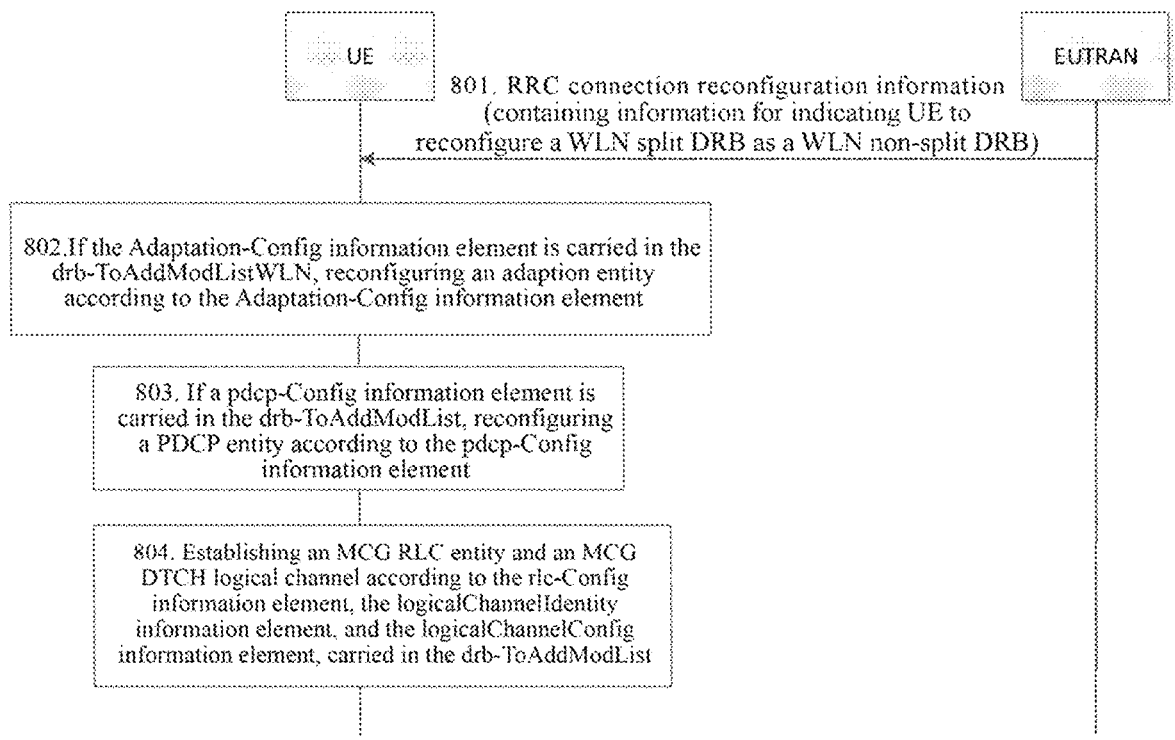
FIG. 8 is a flow chart of a method for reconfiguring a WLN non-split DRB as a WLN split DRB, provided by an embodiment of the present invention.
Figure 9A:
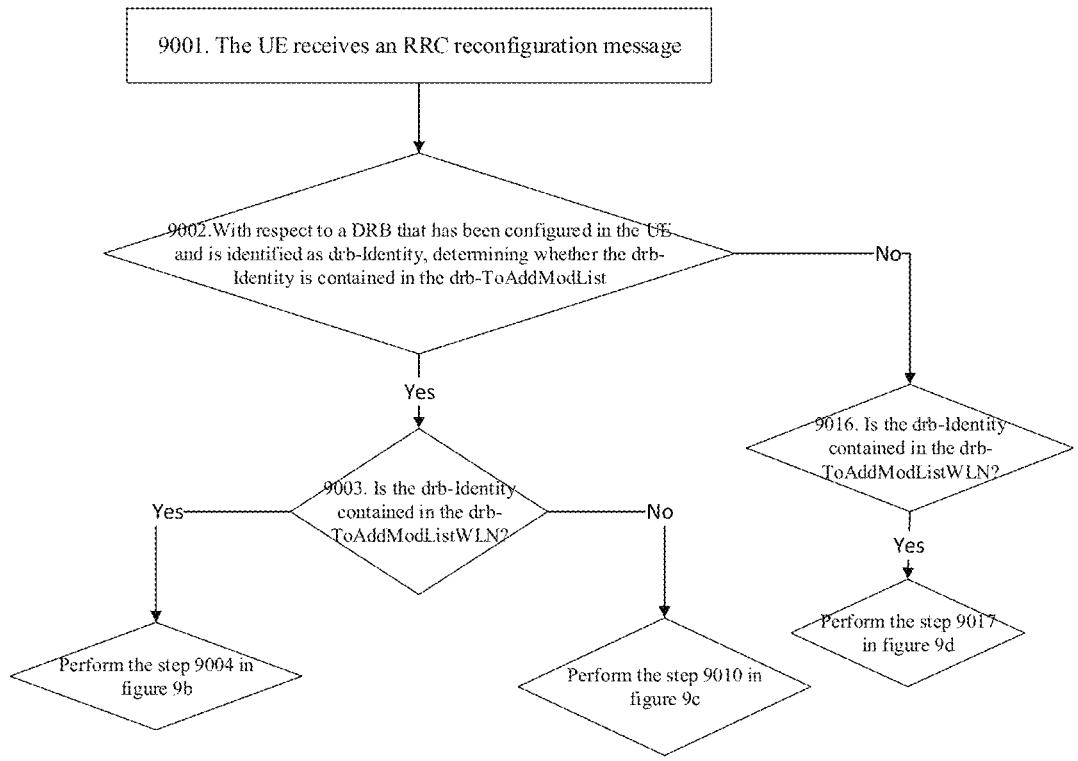
FIGS. 9A through 9D indicate a flow chart of a method in which the RRCConnectionReconfiguration message carries indication information for indicating the UE to reconfigure a type of DRB into another type of DRB, provided by an embodiment of the present invention.
Figure 9B:
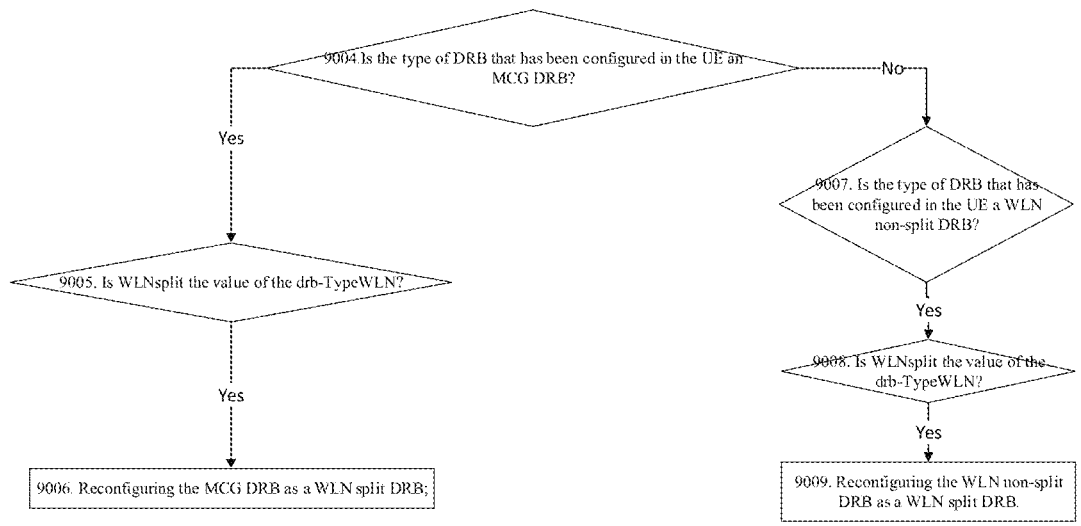
Figure 9C:
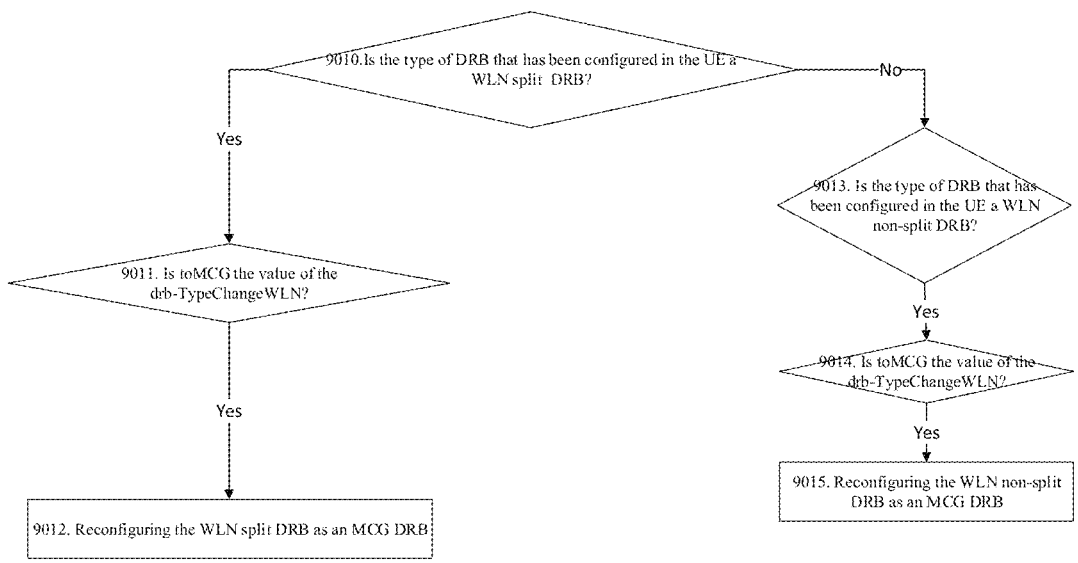
Figure 9D:
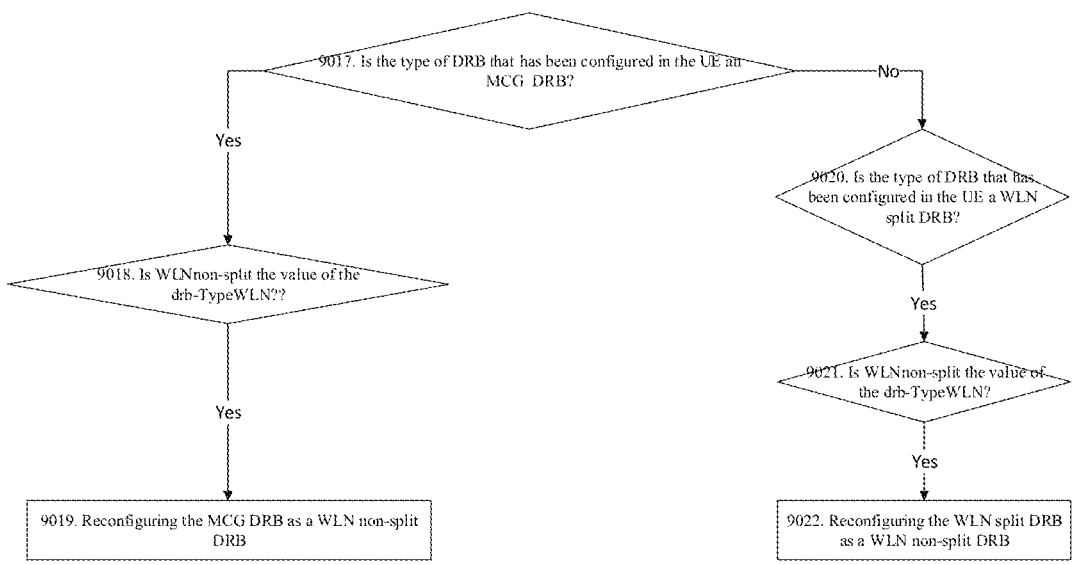
Figure 10A:
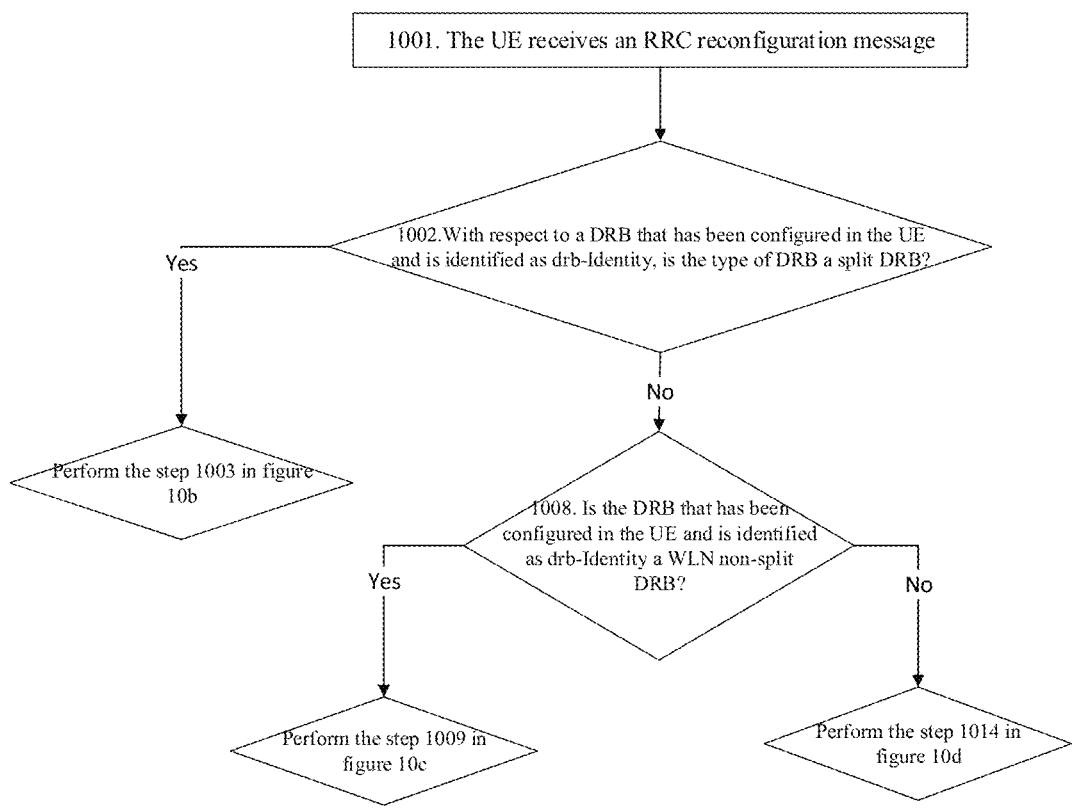
FIGS. 10A through 10D indicate a flow chart of a method in which the RRCConnectionReconfiguration message carries indication information for indicating the UE to reconfigure a type of DRB into another type of DRB, provided by an embodiment of the present invention.
Figure 10B:
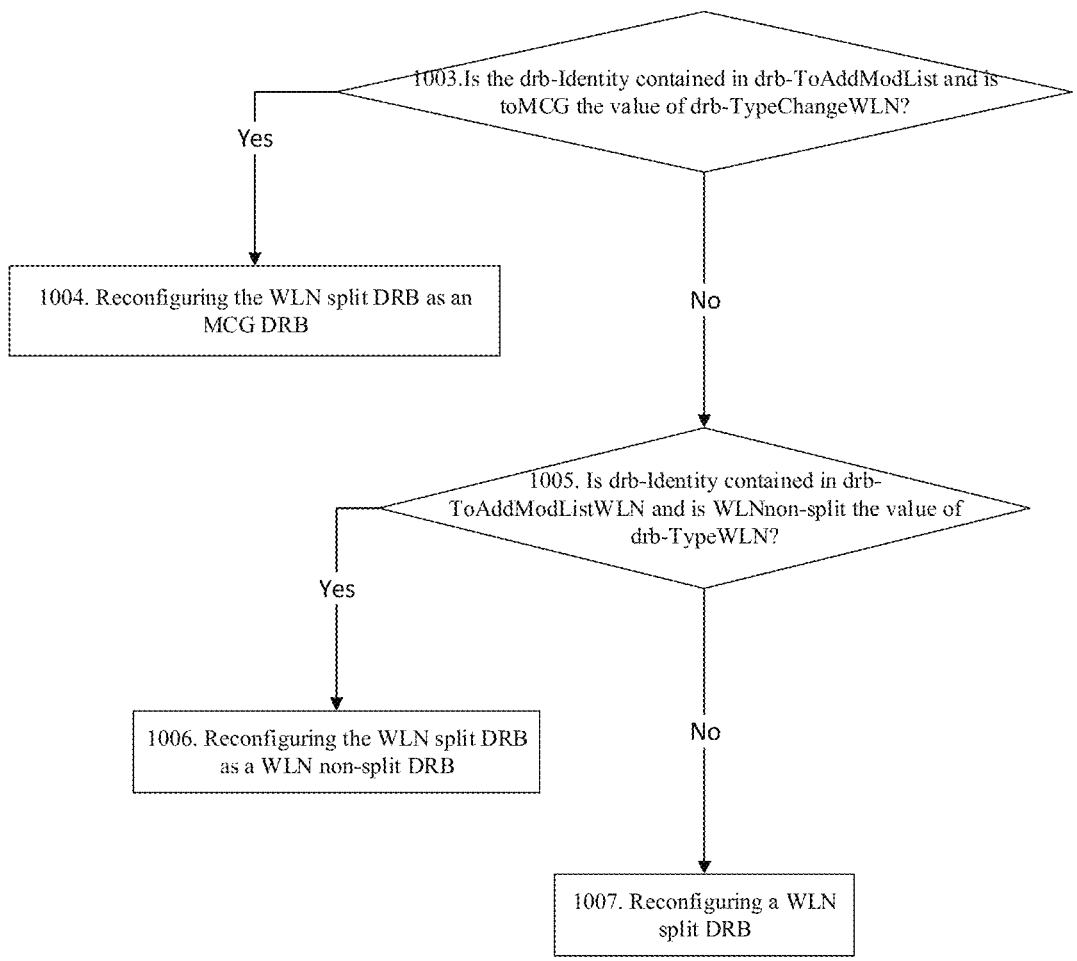
Figure 10C:
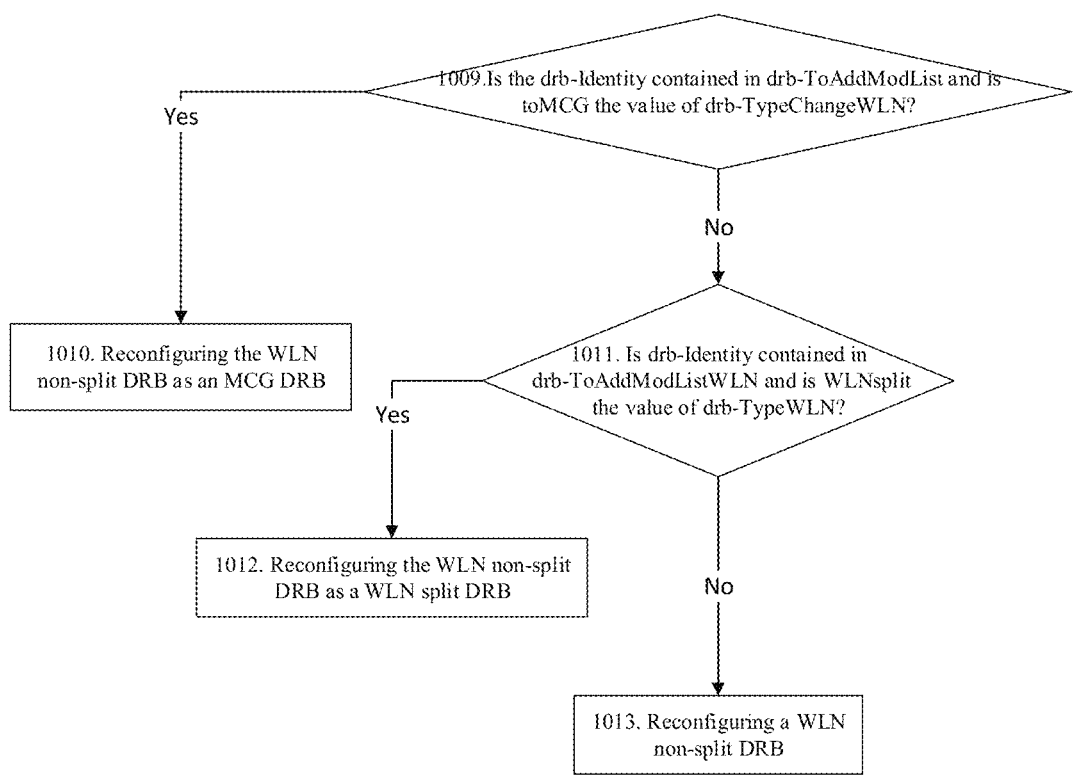
Figure 10D:
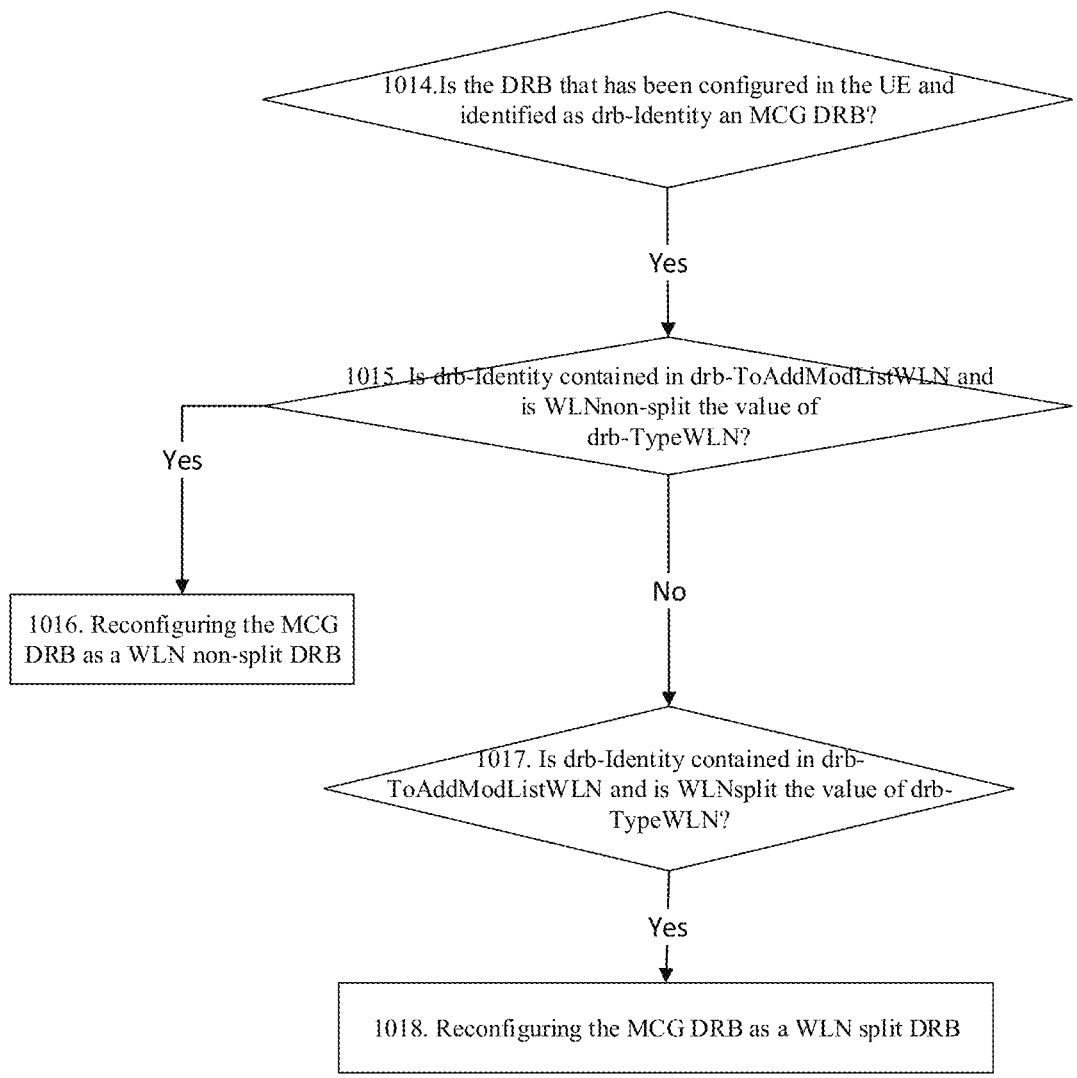

FIG. 8 illustrates a flow chart of a method for reconfiguring a WLN non-split DRB as a WLN split DRB. The method illustrated in FIG. 8 includes the following steps:

Step 801: UE receives an RRCConnectionReconfiguration message and determines whether the message carries an indication information used for indicating the UE to reconfigure a WLN non-split DRB as a WLN split DRB; in a case where the message carries the indication message, the process goes to step 802; otherwise, the process is ended.

Step 802: In a case where the Adaptation-Config information element is carried in the drb-ToAddModListWLN, the adaption entity is reconfigured according to the Adaptation-Config information element.

Step 803: In a case where the pdcp-Config information element is carried in the drb-ToAddModList, the PDCP entity is reconfigured according to the pdcp-Config information element.

Step 804: The MCG RLC entity and the MCG DTCH logical channel are established according to the rlc-Config information element, the logicalChannelIdentity information element, and the logicalChannelConfig information element, carried in the drb-ToAddModList.

Note that the execution sequence of step 802a (or 802b), step 803, and step 804 may be arbitrarily changed.

Alternatively, the UE re-establishes the PDCP entity and transmits a PDCP status report when the WLN non-split DRB is reconfigured as the WLN split DRB. Alternatively, the UE may be configured according to an RRC signaling whether to re-establish the PDCP entity and transmit the PDCP status report when the MCG DRB is reconfigured as the WLN split DRB.

A set of FIGS. 9A through 9D and another set of FIGS. 10A through 10D respectively illustrate flow charts of two methods in which the RRCConnectionReconfiguration message carries indication information for indicating the UE to reconfigure a type of DRB into another type of DRB. The DRBs at least include WLN split DRB, WLN non-split DRB, MCG DRB. In the method illustrated in FIGS. 9A through 9D and 10A through 10D, the UE determines whether to reconfigure a certain type of DRB as another type of DRB, according to the drb-TypeChangeWLN information element carried in the drb-ToAddModList information element and the drb-TypeWLN information element carried in the drb-ToAddModListWLN information element. The drb-TypeChangWLN information element is used to indicate whether to reconfigure a WLN DRB (including WLN split DRB, WLN non-split DRB) as an MCG DRB. The drb-TypeWLN information element represents the type of the corresponding DRB; according to the value of the drb-TypeWLN information element and whether the DRB corresponding to the drb-TypeWLN information element is contained in the drb-ToAddModList information element and the drb-ToAddModListWLN information element, the UE determines whether to reconfigure an MCG DRB as a WLN DRB, or reconfigure a WLN non-split DRB as a WLN split DRB, or reconfigure a WLN split DRB as a WLN non-split DRB. In the embodiment of the present invention, the value of the drb-TypeChangWLN information element is expressed as: to MCG (indicating that WLN DRB is reconfigured as MCG DRB); the value of the drb-TypeWLN information element is expressed as: WLNsplit (indicating that the corresponding DRB is WLN split DRB) or WLN-non-split (indicating that the corresponding DRB is WLN non-split DRB). Note that the valuing of the drb-TypeChangWLN information element and the drb-TypeWLN information element include, but are not limited to, the above-described valuing mode.

The method illustrated in FIGS. 9A through 9D includes the following steps (executed by UE):

Step 9001: UE receives an RRCConnectionReconfiguration message;

Step 9002: with respect to a DRB that has been configured in the UE (the DRB is identified as drb-Identity), the UE determines whether the RRCConnectionReconfiguration message contains a drb-ToAddModList information element, and whether the drb-identity is contained in the drb-ToAddModList information element; If so, the process goes to step 9003; otherwise, the process goes to step 9016;

Step 9003: the UE determines whether the RRCConnectionReconfiguration message contains a drb-ToAddModListWLN information element, and whether the drb-Identity is contained in the drb-ToAddModListWLN information element; If so, the process goes to step 9004; otherwise, the process goes to step 9010;

Step 9004: the UE Determines whether the DRB that has been configured in the UE and is identified as drb-Identity is MCG DRB; If so, the process goes to step 9005; otherwise, the process goes to step 9007;

Step 9005: the UE determines whether the drb-ToAddModListWLN information element contains the drb-TypeWLN information element associated with the drb-Identity and whether the value of the drb-TypeWLN is WLNsplit; If so, the process goes to step 9006;

Step 9006: the UE reconfigures the MCG DRB as a WLN split DRB;

Step 9007: the UE determines whether the DRB that has been configured in the UE and is identified as drb-Identity is a WLN non-split DRB; If so, the process goes to step 9008;

Step 9008: the UE determines whether the drb-ToAddModListWLN information element contains the drb-TypeWLN information element associated with the drb-Identity, and whether the value of the drb-TypeWLN is WLNsplit; If so, the process goes to step 9009;

Step 9009: the UE reconfigures the WLN non-split DRB as a WLN split DRB;

Step 9010: the UE determines whether the DRB that has been configured in the UE and is identified as drb-Identity is a WLN split DRB; If so, the process goes to step 9011; otherwise, the process goes to step 9013;

Step 9011: the UE determines whether the drb-ToAddModList information element contains a drb-TypeChangeWLN information element associated with the drb-identity, and whether the value of the drb-TypeChangeWLN is to MCG; If so, the process goes to step 9012;

Step 9012: the UE reconfigures the WLN split DRB as an MCG DRB;

Step 9013: the UE determines whether the DRB that has been configured in the UE and is identified as drb-Identity is a WLN non-split DRB; If so, the process goes to step 9014;

Step 9014: the UE determines whether the drb-ToAddModList information element contains a drb-TypeChangeWLN information element associated with the drb-Identity, and whether the value of the drb-TypeChangeWLN is to MCG? If so, the process goes to step 9015;

Step 9015: the UE reconfigures the WLN non-split DRB as an MCG DRB;

Step 9016: the UE determines whether the RRCConnectionReconfiguration message contains a drb-ToAddModListWLN information element, and whether the drb-identity is contained in the drb-ToAddModListWLN information element; If so, the process goes to step 9017; step 9017: the UE determines whether the DRB that has been configured in the UE and is identified as drb-Identity is an MCG DRB. If so, the process goes to step 9018; otherwise, the process goes to step 9020;

Step 9018: the UE determines whether the drb-ToAddModListWLN information element contains a drb-TypeWLN information element corresponding to the drb-Identity, and whether the value of the drb-TypeWLN is WLNnon-split; If so, the process goes to step 9019;

Step 9019: the UE reconfigures the MCG DRB as a WLN non-split DRB;

Step 9020: the UE determines whether the DRB that has been configured in the UE and is identified as drb-Identity is a WLN split DRB; If so, the process goes to step 9021; step 9021: the UE determines whether a drb-TypeWLN information element corresponding to the drb-Identity is contained in the drb-ToAddModListWLN information element, and whether the value of the drb-TypeWLN is WLNnon-split; If so, the process goes to step 9022; and Step 9022: the UE reconfigures the WLN split DRB as a WLN non-split DRB.

The method illustrated in FIGS. 10A through 10D includes the following steps (executed by UE):

Step 1001: UE receives an RRCConnectionReconfiguration message;

Step 1002: the UE determines whether a DRB that has been configured in the UE and is identified as drb-Identity is a WLN split DRB; If so, the process goes to step 1003; otherwise, the process goes to step 1008;

Step 1003: the UE determines whether the RRCConnectionReconfiguration message contains a drb-ToAddModList information element, whether the drb-ToAddModList information element contains the drb-identity, whether the drb-ToAddModList information element further contains a drb-TypeChangeWLN information element corresponding to the drb-identity, and whether the value of the drb-TypeChangeWLN is to MCG; If so, the process goes to step 1004; otherwise, the process goes to step 1005;

Step 1004: the UE reconfigures the WLN split DRB as an MCG DRB;

Step 1005: the UE determines whether the RRCConnectionReconfiguration message contains a drb-ToAddModListWLN information element, whether the drb-ToAddModListWLN information element contains the drb-identity, whether the drb-ToAddModListWLN information element further contains a drb-TypeWLN information element corresponding to the drb-identity, and whether the value of the drb-TypeWLN is WLNnon-split; If so, the process goes to step 1006; otherwise, the process goes to step 1007;

Step 1006: the UE reconfigures the WLN split DRB as a WLN non-split DRB.

Step 1007: the UE reconfigures the MCG DRB as a WLN non-split DRB;

Step 1008: the UE determines whether the DRB that has been configured in the UE and is identified as drb-Identity is a WLN non-split DRB; If so, the process goes to step 1009; otherwise, the process goes to step 1014;

Step 1009: the UE determines whether the RRCConnectionReconfiguration message contains a drb-ToAddModList information element, whether the drb-ToAddModList information element contains the drb-identity, whether the drb-ToAddModList information element further contains a drb-TypeChangeWLN information element corresponding to the drb-identity, and whether the value of the drb-TypeChangeWLN is to MCG; If so, the process goes to step 1010; otherwise, the process goes to step 1011;

Step 1010: the UE reconfigures the WLN non-split DRB as an MCG DRB;

Step 1011: the UE determines whether the RRCConnectionReconfiguration message contains a drb-ToAddModListWLN information element, whether the drb-ToAddModListWLN information element contains the drb-identity, whether the drb-ToAddModListWLN information element further contains a drb-TypeWLN information element corresponding to the drb-identity, and whether the value of the drb-TypeWLN is WLNsplit; If so, the process goes to step 1012; otherwise, the process goes to step 1013;

Step 1012: the UE reconfigures the WLN non-split DRB as a WLN split DRB.

Step 1013: the UE reconfigures the WLN split DRB as a WLN non-split DRB;

Step 1014: the UE determines whether the DRB that has been configured in the UE and is identified as drb-Identity is MCG DRB. If so, the process goes to step 1015; and Step 1015: the UE determines whether the RRCConnectionReconfiguration message contains a drb-ToAddModListWLN information element, whether the drb-ToAddModListWLN information element contains the drb-identity, whether the drb-ToAddModListWLN information element further contains a drb-TypeWLN information element corresponding to the drb-identity, and whether the value of the drb-TypeWLN is WLNnon-split; If so, the process goes to step 1016; otherwise, the process goes to step 1017;

Step 1016: the UE reconfigures the MCG DRB as a WLN non-split DRB;

Step 1017: the UE determines whether the RRCConnectionReconfiguration message contains a drb-ToAddModListWLN information element, whether the drb-ToAddModListWLN information element contains the drb-identity, whether the drb-ToAddModListWLN information element further contains a drb-TypeWLN information element corresponding to the drb-identity, and whether the value of the drb-TypeWLN is WLNsplit; If so, the process goes to step 9018; and Step 1018: the UE reconfigures the MCG DRB as a WLN split DRB;

Note that the process of reconfiguring the WLN split DRB as an MCG DRB in step 9012 and step 1004 may be carried out according to the procedure illustrated in FIG. 5. The process of reconfiguring the WLN split DRB as a WLN non-split DRB in step 9022 and step 1006 may be carried out according to the procedure illustrated in FIG. 6. The process of reconfiguring the WLN non-split DRB as an MCG DRB in step 9015 and step 1010 may be carried out according to the procedure illustrated in FIG. 7. The process of reconfiguring the WLN non-split DRB as a WLN split DRB in step 9009 and step 1012 may be carried out according to the procedure illustrated in FIG. 8. The process of reconfiguring the MCG DRB as a WLN split DRB in step 9006 and step 1018 may be carried out according to the procedure illustrated in FIG. 3. The process of reconfiguring the MCG DRB as a WLN non-split DRB in step 9019 and step 1016 may be carried out according to the procedure illustrated in FIG. 4.

According to an embodiment of the present invention, the user equipment establishing the WLN slit DRB includes the following process: in a case where there is a many-to-one mapping relationship between a WLN DRB and an adaptation entity, the adaptation entity is reconfigured according to the Adaptation-Config information element carried in the drb-ToAddModListWLN. Alternatively, an adaptation entity is established in a case where there is no adaptation entity in the WLN, i.e. the WLN split DRB that needs to be established is the first WLN DRB of the adaptation entity. In a case where there is a one-to-one mapping relationship between a WLN DRB and an adaptation entity, the adaptation entity is established according to the Adaptation-Config information element carried in drb-ToAddModListWLN. A PDCP entity is established according to the pdcp-Config information element carried in the drb-ToAddModList, and the PDCP entity is configured by using MCG security configuration information.

An MCG RLC entity and an MCG DTCH logical channel are established according to the rlc-Config information element, the logicalChannelIdentity information element, and the logicalChannelConfig information element, carried in the drb-ToAddModList.

According to an embodiment of the present invention, the user equipment establishing the WLN non-split DRB includes the following process: in a case where there is a many-to-one mapping relationship between a WLN DRB and an adaptation entity, the adaptation entity is reconfigured according to the Adaptation-Config information element carried in the drb-ToAddModListWLN. Alternatively, an adaptation entity is established in a case where there is no adaptation entity in the WLN, i.e. the WLN split DRB that needs to be established is the first WLN DRB of the adaptation entity. In a case where there is a one-to-one mapping relationship between a WLN DRB and an adaptation entity, the adaptation entity is established according to the Adaptation-Config information element carried in drb-ToAddModListWLN. A PDCP entity is established according to the pdcp-Config information element carried in the drb-ToAddModList, and the PDCP entity is configured by using MCG security configuration information. Alternatively, a PDCP entity is established according to the pdcp-Config information element carried in the drb-ToAddModListWLN, and the PDCP entity is configured by using MCG security configuration information.

According to an embodiment of the present invention, the user equipment reconfiguring the WLN split DRB includes the following process: in a case where the Adaption-Config information element is carried in the drb-ToAddModListWLN, the adaptation entity is reconfigured according to the Adaptation-Config information element. In a case where the pdcp-Config information element is carried in the drb-ToAddModList, the PDCP entity is reconfigured according to the pdcp-Config information element. Alternatively, in a case where the pdcp-Config information element is carried in the drb-ToAddModListWLN, the PDCP entity is reconfigured according to the pdcp-Config information element. In a case where the drb-ToAddModList carries the rlc-Config information element, the logicalChannelIdentity information element, and the logicalChannelConfig information element, the MCG RLC entity and the MCG DTCH logical channel are reconfigured according to the rlc-Config information element, the logicalChannelIdentity information element, and the logicalChannelConfig information element. Alternatively, the UE re-establishes the PDCP entity and transmits a PDCP status report when the UE reconfigures a WLN split DRB. Alternatively, the UE may be configured according to an RRC signaling whether to re-establish the PDCP entity and transmit a PDCP status report when a WLN split DRB is reconfigured.

According to an embodiment of the present invention, the user equipment reconfiguring the WLN split DRB includes the following process: in a case where the Adaption-Config information element is carried in the drb-ToAddModListWLN, the adaptation entity is reconfigured according to the Adaptation-Config information element. In a case where the pdcp-Config information element is carried in the drb-ToAddModList, the PDCP entity is reconfigured according to the pdcp-Config information element. Alternatively, in a case where the pdcp-Config information element is carried in the drb-ToAddModListWLN, the PDCP entity is reconfigured according to the pdcp-Config information element.

Alternatively, the UE re-establishes the PDCP entity and transmits a PDCP status report when the UE reconfigures a WLN non-split DRB. Alternatively, the UE may be configured according to an RRC signaling whether to re-establish the PDCP entity and transmit a PDCP status report when a WLN non-split DRB is reconfigured.

Figure 11:
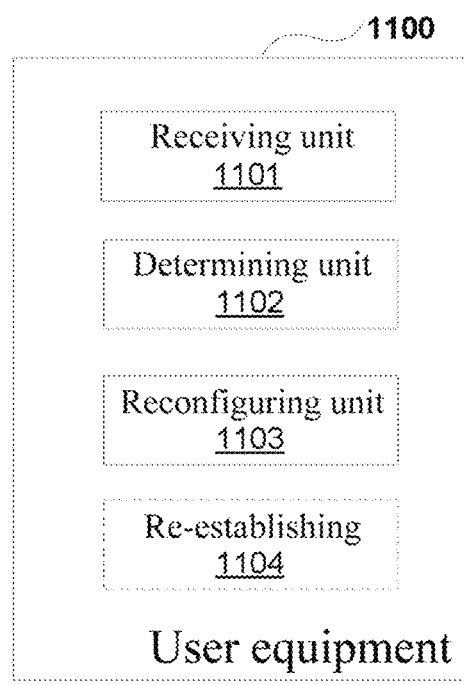
FIG. 11 is a block diagram of user equipment according to an embodiment of the present invention.

FIG. 11 is a block diagram of user equipment according to an embodiment of the present invention. As illustrated in FIG. 11, the UE 1100 includes a receiving unit 1101, a determining unit 1102, and a reconfiguring unit 1103. Alternatively, the UE 1100 may further include a re-establishing unit 1104.

The receiving unit 1101 may be configured to receive an RRCConnectionReconfiguration message.

The determining unit 1102 is configured to determine whether the received RRCConnectionReconfiguration message contains indication information, the indication information indicating the UE to reconfigure the first type of DRB as the second type of DRB that is different from the first type.

The reconfiguring unit 1103 is configured to reconfigure the UE according to the RRCConnectionReconfiguration message in a case where the received RRCConnectionReconfiguration message contains indication information.

The re-establishing unit 1104 can be configured to re-establish a PDCP entity.

According to an embodiment of the present invention, the first type of DRB may include an MCG DRB, a WLN split DRB or a WLN non-split DRB. The second type of DRB may include an MCG DRB, a WLN split DRB, or a WLN non-split DRB.

It will be appreciated by those skilled in the art that the UE 1100 illustrated in FIG. 11 may be configured to perform the various methods described above with respect to FIGS. 3 to 10D. For the sake of brevity, the description is not repeated herein.

It is to be understood that the above-described embodiments of the present invention may be implemented by software or by hardware or by a combination of both software and hardware. For example, the various components within the user equipment in the above embodiments may be implemented by a variety of devices including, but not limited to, analog circuit devices, digital circuit devices, digital signal processing (DSP) circuits, programmable processors, application-specific integrated circuits (ASICs), field programmable gate arrays (FPGAs), programmable logic devices (CPLDs), and the like.

In this application, the term "base station" refers to a mobile communication data and control switching center having a large transmission power and a wide coverage area and including functions such as resource allocation scheduling, data reception and transmission, and the like. The term "user equipment" refers to a user mobile terminal, such as a terminal device that can perform wireless communication with a base station or a micro base station, including a mobile phone, a notebook, or the like.

In addition, embodiments of the invention disclosed herein may be implemented on a computer program product.

More specifically, the computer program product is one of those having a computer-readable medium encoded with computer program logic, which, when executed on a computing device, provides the associated operations to achieve the above technical solution of the present invention. When executed on at least one processor of a computing system, the computer program logic causes the processor to perform the operations (methods) described in the embodiments of the present invention. Such an arrangement of the present invention is typically provided as software, codes, and/or other data structures that are arranged or encoded on a computer-readable medium, such as an optical medium (e.g., a CD-ROM), a floppy disk or a hard disk, or, for example, other media for a firmware or a microcode on one or more ROM or RANI or PROM chips, or the downloadable software images, shared database and so on in one or more modules. Software or firmware or such configuration may be installed on a computing device such that one or more processors in the computing device perform the technical solutions described in the embodiments of the present invention.

While the present invention has been described in connection with the preferred embodiments of the present invention, it will be understood by those skilled in the art that various modifications, substitutions, and alterations may be made therein without departing from the spirit and scope of the invention. Accordingly, the present invention should not be limited by the above-described embodiments, but rather by the appended claims and their equivalents.

The invention claimed is:

1. A user equipment (UE) comprising:

receiving circuitry configured to receive an RRC message which reconfigures a first data radio bearer (DRB) to a second DRB, and an RRC signaling indicating whether or not the user equipment re-establishes a PDCP entity when the first DRB is reconfigured as the second DRB; and configuration circuitry configured to re-establish the PDCP entity, if the RRC signaling indicates that the user equipment re-establishes the PDCP entity when the first DRB is reconfigured as the second DRB.

2. A method performed by a user equipment (UE) comprising:

receiving an RRC message which reconfigures a first data radio bearer (DRB) to a second DRB, and an RRC signaling indicating whether or not the user equipment re-establishes a PDCP entity when the first DRB is reconfigured as the second DRB, wherein if the RRC signaling indicates that the user equipment re-establishes the PDCP entity when the first DRB is reconfigured as the second DRB, the method further comprises:

re-establishing the PDCP entity.

* * * * *